(12) United States Patent
Davis et al.

(10) Patent No.: US 11,365,315 B2
(45) Date of Patent: Jun. 21, 2022

(54) SULFONATED POLYAMIDE POLYMER BLENDS AND CORRESPONDING ARTICLES

(71) Applicant: SOLVAY SPECIALTY POLYMERS USA, LLC, Alpharetta, GA (US)

(72) Inventors: Raleigh L. Davis, Duluth, GA (US); Keshav S. Gautam, Duluth, GA (US); Stéphane Jeol, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 92 days.

(21) Appl. No.: 16/758,409

(22) PCT Filed: Oct. 10, 2018

(86) PCT No.: PCT/EP2018/077655
§ 371 (c)(1),
(2) Date: Apr. 23, 2020

(87) PCT Pub. No.: WO2019/086224
PCT Pub. Date: May 9, 2019

(65) Prior Publication Data
US 2020/0247992 A1    Aug. 6, 2020

Related U.S. Application Data

(60) Provisional application No. 62/579,475, filed on Oct. 31, 2017.

(51) Int. Cl.
*C08L 77/04*   (2006.01)
(52) U.S. Cl.
CPC .......... *C08L 77/04* (2013.01); *C08L 2205/02* (2013.01)
(58) Field of Classification Search
CPC ................................................ C08L 77/00–12
See application file for complete search history.

(56) References Cited

U.S. PATENT DOCUMENTS

| | | |
|---|---|---|
| 3,846,507 A | 11/1974 | Thomm et al. |
| 3,957,734 A | 5/1976 | Radlmann et al. |
| 9,732,222 B2 | 8/2017 | Touraud et al. |
| 2007/0154668 A1 | 7/2007 | Rhee et al. |
| 2012/0172521 A1* | 7/2012 | Touraud ................. C08G 69/42 524/606 |

OTHER PUBLICATIONS

Hausrath R. L. et al., "Fiberglass and Glass Technology", 2010, XIV, Chapter 5, pp. 197-225, F.T. Wallenberger and P.A. Bingham (eds.).
Murphy J., in "Additives for Plastics Handbook", 2nd Edition, 2001, Chapter 5.2.3., p. 43-48—Elsevier Advanced Technology.
ASTM D2343-09, Standard Test Method for Tensile Properties of Glass Fiber Strands, Yarns, and Rovings Used in Reinforced Plastics, 2009, p. 1-7.
ISO 178, Plastics—Determination of flexural properties—Fifth Edition, Dec. 15, 2010, p. 1-19.
ISO 527-2, Plastics—Determination of tensile properties—Part 2: Test conditions for moulding and extrusion plastics, Feb. 15, 2012, p. 1-11.

* cited by examiner

*Primary Examiner* — Ana L. Woodward
(74) *Attorney, Agent, or Firm* — Osha Bergman Watanabe & Burton LLP

(57) ABSTRACT

Described herein are polyamide polymer blends including a sulfonated polyamide polymer, an aromatic polyamide polymer and a reinforcing filler. Optionally, the polyamide polymer blend includes an additive. It was surprisingly discovered that blends including a sulfonated polyamide polymer in addition to an aromatic polyamide polymer had increased mechanical performance, relative to corresponding polyamide polymer blends having a non-sulfonated polyamide polymer. Furthermore, it was also surprisingly discovered that, when the sulfonated polyamide polymer included a sodium counter-ion, the mechanical performance of the polyamide polymer blend was further enhanced, relative to corresponding polyamide polymer blends having a sulfonated polyamide polymer including a lithium counter-ion in place of a sodium counter-ion. Due, at least in part, to the increased mechanical performance, the polyamide polymer blends can be desirably incorporated into structural components, which generally benefit from higher mechanical performance.

16 Claims, No Drawings

SULFONATED POLYAMIDE POLYMER BLENDS AND CORRESPONDING ARTICLES

CROSS-REFERENCE TO RELATED APPLICATIONS

This application is a U.S. national stage entry under 35 U.S.C. § 371 of International Application No. PCT/EP2018/077655 filed Oct. 10, 2018, which claims priority to U.S. provisional patent application No. 62/579,475, filed Oct. 31, 2017, the whole content of this application being incorporated herein by reference for all purposes.

FIELD OF THE INVENTION

The invention relates to sulfonated polyamide polymer blends having excellent mechanical performance. The invention further relates to articles incorporating the polymer blends.

BACKGROUND OF THE INVENTION

Mobile electronic devices such as mobile phones, personal digital assistants (PDAs), laptop computers, tablet computers, smart watches, portable audio players, and so on, are in widespread use around the world. Mobile electronic devices are getting smaller and lighter for even more portability and convenience, while at the same time becoming increasingly capable of performing more advanced functions and services, both due to the development of the devices and network systems.

While in the past, low density metals such as magnesium or aluminum, were the materials of choice for mobile electronic parts, synthetic resins have progressively come as at least partial replacement, for costs reasons (some of these less dense metals such as magnesium are somewhat expensive, and manufacturing the often small and/or intricate parts needed is expensive), for overriding design flexibility limitations, for further weight reduction, and for providing un-restricted aesthetic possibilities, thanks to the colorability of the same. It is therefore desirable that plastic mobile electronic parts are made from materials that are easy to consistently process into various and complex shapes and have high impact performance to sustain the rigors of daily use, while not interfering with their intended operability (e.g. radio communications).

DETAILED DESCRIPTION OF THE INVENTION

Described herein are polyamide polymer blends including a sulfonated polyamide polymer, a semi-aromatic polyamide polymer and a reinforcing filler. Optionally, the polyamide polymer blend includes an additive. It was surprisingly discovered that blends including a sulfonated polyamide polymer in addition to semi-aromatic polyamide polymer had increased mechanical performance, relative to corresponding polyamide polymer blends having a non-sulfonated polyamide polymer. Furthermore, it was also surprisingly discovered that, when the sulfonated polyamide polymer included a sodium counter-ion, the mechanical performance of the polyamide polymer blend was further enhanced, relative to corresponding polyamide polymer blends having a sulfonated polyamide polymer including a lithium counter-ion in place of a sodium counter-ion. Due, at least in part, to the increased mechanical performance, the polyamide polymer blends can be desirably incorporated into structural components, which generally benefit from higher mechanical performance.

Blends of aliphatic polyamide polymers and semi-aromatic polyamide polymers are used to achieve a balance of properties in structural applications including, but not limited to, mobile electronic device components. Aliphatic polyamide polymers have excellent elongation and impact performance, however, they generally suffer from relative poor stiffness and strength that is required in structural applications. Accordingly, polyamide polymer compositions for structural application generally also include a semi-aromatic polyamide polymer. While semi-aromatic polyamide polymers have relative poor elongation and impact performance, they have excellent stiffness and strength. Accordingly, though the polyamide polymer blend has reduced elongation and impact performance, relative to a polyamide polymer alone, and a reduced stiffness and strength, relative to the semi-aromatic polyamide polymer alone, the balance of elongation, impact, stiffness and strength achieved in the blend is satisfactory for structurally applications. Nevertheless, as structural application settings require increasingly smaller components (e.g. mobile electronic devices are getting increasingly smaller or thinner), there is an industry demand for polyamide polymer blends with increased mechanical performance.

Until now, it was not known that sulfonation could be used to increase the room temperature mechanical properties of a polyamide polymer blend including the polyamide polymer and a semi-aromatic polyamide polymer. Sulfonated polyamide polymers, and their synthesis, are described in U.S. Pat. No. 9,732,222 to Touraud et al., entitled "Modified Polyamide Composition, (the "222 patent") incorporated herein by reference. The '222 patent describes the use of sulfonation to increase the glass transition temperature of a polyamide polymer, as well as to increase the elastic modulus above the glass transition temperature. However, until now, it was not known that sulfonation could be used to significantly increase the room temperature tensile and flexural moduli, as well as the room temperature tensile and flexural strengths and impact performance, of polyamide polymer compositions including a corresponding polyamide and a semi-aromatic polyamide.

In some embodiments, the polyamide polymer blend has a tensile modulus of at least 10 gigapascals ("GPa") or at least 15 GPa. Additionally or alternatively, in some embodiments, the polyamide polymer blends have a tensile modulus of no more than 35 GPa, no more than 30 GPa or no more than 25 GPa. In some embodiments, the polyamide polymer blend has a tensile modulus of from 10 GPa to 35 GPa, from 15 GPa to 30 GPa, from 15 GPa to 25 GPa. Tensile modulus can be measured as described in the Examples, below.

In some embodiments, the polyamide polymer blend has a tensile strength of at least 200 megapascals ("MPa") or at least 250 MPa. Additionally or alternatively, in some embodiments, the polyamide polymer blend has a tensile strength of no more than 500 MPa, no more than 450 MPa, no more than 400 MPa, or no more than 350 MPa. In some embodiments, the polyamide polymer blend has a tensile strength of from 200 MPa to 500 MPa, from 250 MPa to 500 MPa, from 250 MPa to 450 MPa, from 250 MPa to 400 MPa, or from 250 MPa to 350 MPa. Tensile strength can be measured as described in the Examples, below.

In some embodiments, the polyamide polymer blend has a flexural modulus of at least 10 GPa or at least 15 GPa. Additionally or alternatively, in some embodiments, the polyamide polymer blend has a flexural modulus of no more than 35 GPa, no more than 30 GPa or no more than 25 GPa.

In some embodiments, the polyamide polymer blend has a flexural modulus of from 10 GPa to 35 GPa, from 15 GPa to 35 GPa, from 15 GPa to 30 GPa, or from 15 GPa to 25 GPa. Flexural modulus can be measured as described in the Examples, below.

In some embodiments, the polyamide polymer blend has a flexural strength of at least 250 MPa or at least 350 MPa. Additionally or alternatively, in some embodiments, the polyamide polymer blend has a flexural strength of no more than 700 MPa, no more than 600 MPa or no more than 500 MPa. In some embodiments, the polyamide polymer composition has a flexural strength of from 250 MPa to 700 MPa, from 350 MPa to 700 MPa, from 350 MPa to 600 MPa, or from 350 MPa to 500 MPa can be measured as described in the Examples, below.

The Sulfonated Polyamide Polymer

The polyamide polymer blend includes a sulfonated polyamide polymer. A sulfonated polyamide polymer refers to a polyamide having, in total, at least 51 mole percent ("mol %") recurring units ($R_{PA1}$) and ($R_{PA2}$), relative to the total number of moles of recurring units in the sulfonated aliphatic polyamide. In some embodiments, the sulfonated aliphatic polyamide has, in total, at least 60 mol %, at least 70 mol %, at least 80 mol %, at least 90 mol %, at least 95 mol % or at least 99 mol % recurring units ($R_{PA1}$) and ($R_{PA2}$), relative to the total number of moles of recurring units in the sulfonated aliphatic polyamide. The mole ratio of the number of moles of recurring unit ($R_{PA1}$) to the number of moles of recurring unit ($R_{PA2}$) ($N_{(RPA1)}:N_{(RPA2)}$) is no more than 97:3, or no more than 95:5. Additionally or alternatively, in some embodiments, $N_{(RPA1)}:N_{(RPA2)}$ is at least 87:15, at least 90:10 or at least 93:7. In some embodiments, $N_{(RPA1)}:N_{(RPA2)}$ is from 97:3 to 87:15, from 97.3 to 90:10, from 95:5 to 90:10 or from 95:5 to 93:7. Recurring unit ($R_{PA1}$) is represented by the following formula:

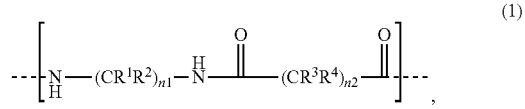
(1)

and recurring unit ($R_{PA2}$) is represented by a formula selected from the following group of formulae

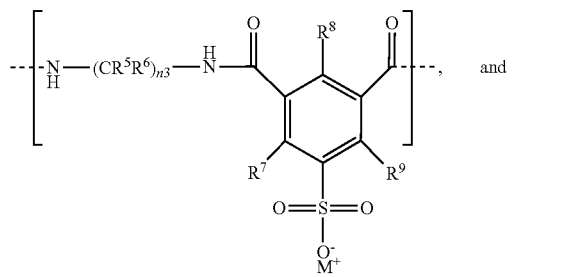
(2a)

and

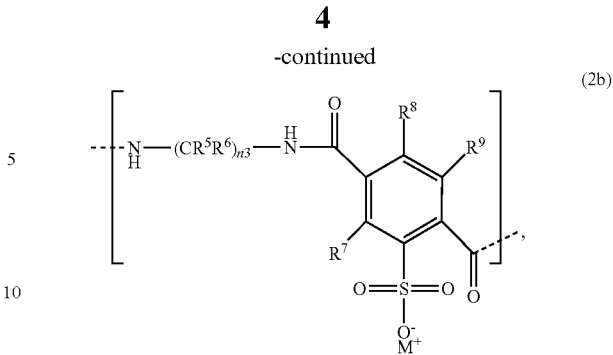
(2b)

where $R^1$ to $R^6$, at each location, and $R^7$ to $R^9$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; M is either H, Li, Na or K, preferably either Li or Na; $n_1$ and $n_3$ are independently selected integers from 4 to 12, preferably from 4 to 10; and $n_2$ is an integer from 5 to 12, preferably from 4 to 10. Preferably, recurring unit ($R_{PA2}$) is represented by Formula (2b). Preferably, $R^1$ to $R^6$, at each location, and $R^7$ to $R^9$ are all hydrogen. In some embodiments, $n_1$ is an integer from 4 to 10 and $n_2$ is an integer from 5 to 12. Excellent results were achieved with $R^1$ to $R^6$, at each location, and $R^7$ to $R^9$ all selected as hydrogen; $n_1$ and $n_2$ selected as 6; and $n_3$ selected as 4. As used herein, a dashed bond ("- - - -") indicates a bond to an atom outside the drawn structure but still within the polymer chain. For example, the dashed bond can indicate a bond to an atom of an adjacent recurring unit.

Of course, the sulfonated polyamide polymer can include a plurality of recurring units. In some such embodiments, one or all of the other recurring units is represented by a Formula (1), (2a) or (2b), such that each recurring unit is distinct from each other recurring unit. In such embodiments, the total concentration of all recurring units represented by a Formula (1), (2a) or (2b) is within the ranges specified above with respect to the total concentration of recurring units ($R_{PA1}$) and ($R_{PA2}$).

In general, the sulfonated polyamide polymer has an inherent viscosity that is suitable for injection molding processes, though sulfonated polyamide polymers having a lower inherent viscosity can be used. In some embodiments, the sulfonated poly amide polymer has an inherent viscosity from 0.7 deciliters per gram ("dL/g") to 1.4 dL/g. Inherent viscosity can be measured according to ASTM D5336.

In some embodiments, the concentration of the sulfonated polyamide polymer in the polyamide polymer blend is at least 5 weight percent ("wt. %"), at least 10 wt. % or at least 25 wt. %. Additionally or alternatively, in some embodiments, the concentration of the sulfonated polyamide polymer in the polyamide polymer blend is no more than 60 wt. % or no more than 50 wt. %. In some embodiments, the concentration of the sulfonated polyamide polymer in the polyamide polymer blend is from 5 wt. % to 65 wt. %, from 10 wt. % to 50 wt. %, or from 25 wt. % to 50 wt. %. As used herein, wt. % is relative to the total weight of the polyamide polymer blend, unless explicitly indicated otherwise.

The sulfonated polyamide polymer can be synthesized using techniques well known in the art. For example, the synthesis of sulfonated polyamide polymers via incorporation of a sulfonated compound during polycondensation is described in the '222, patent incorporated herein by reference. The '222 patent describes a sulfonated compound having group that can react with the diamine or dicarboxylic monomers that polycondense to form the polyamide. Accordingly, the sulfonated compound is incorporated into the polyamide chain during synthesis.

The Semi-Aromatic Polyamide Polymer

The polyamide polymer blend includes a semi-aromatic polyamide polymer. A semi-aromatic polyamide polymer refers to a polymer having at least 50 mol % recurring unit ($R_{PA3}$), relative to the total number of recurring units in the semi-aromatic polyamide polymer. In some embodiments, the semi-aromatic polyamide polymer has at least 60 mol %, at least 70 mol %, at least 80 mol %, at least 90 mol %, at least 95 mol % or at least 99 mol % of recurring unit ($R_{PA3}$), relative to the total number of moles of recurring units in the semi-aromatic polyamide polymer.

Recurring unit ($R_{PA3}$) is represented by a formula selected from the following group of formulae:

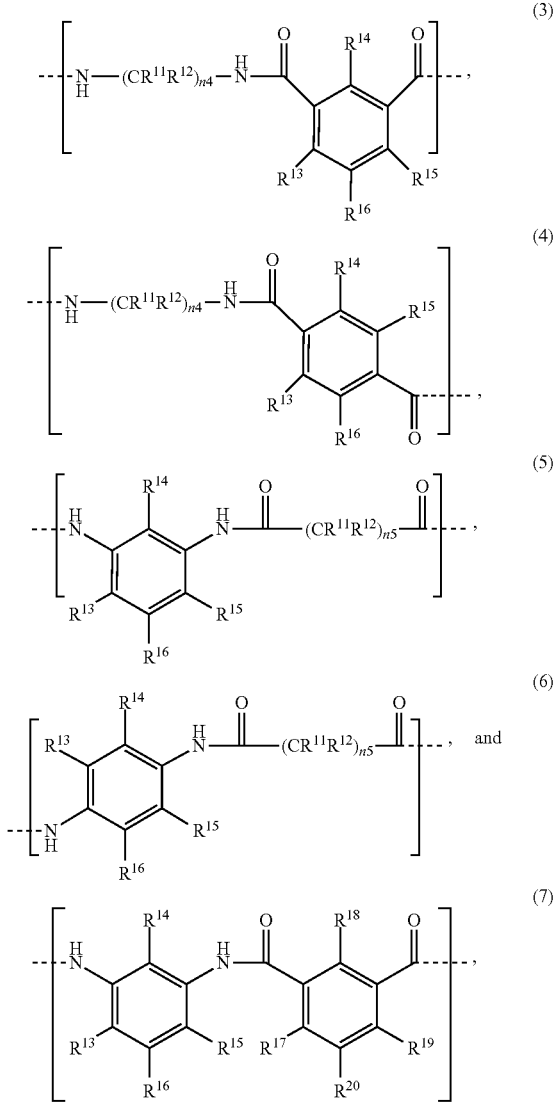

where $R^{11}$ and $R^{12}$, at each location, and $R^{13}$ to $R^{20}$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; $n_4$ is an integer from 4 to 12, preferably from 4 to 10; and $n_5$ is an integer from 4 to 12, preferably from 4 to 10. Preferably, $R^{11}$ and $R^{12}$, at each location, and $R^{13}$ to $R^{20}$ are all hydrogen. Excellent results were achieved with the semi-aromatic polymer was selected as MXD6.

In some embodiments, the semi-aromatic polyamide polymer includes additional recurring units, where each additional recurring unit is represented by a formula selected from the group consisting of Formulae (3) to (6). In such embodiments, each additional recurring unit is distinct from each other, as well as from recurring unit ($R_{PA3}$). In one such embodiment, the semi-aromatic polyamide polymer includes recurring unit ($R_{PA3}$) represented by Formula (4) and (i) a recurring unit ($R^*_{PA3}$) represented by Formulae (1) or Formula (3) or (ii) recurring units ($R^*_{PA3}$) and ($R^{**}_{PA3}$) represented by Formulae (1) and Formula (3), respectively. Examples of such embodiments include, but are not limited to, PA6T/6I, PA6T/66 and PA6T/6I/66. In some of the aforementioned embodiments (i) and (ii), the total number of moles of recurring unit ($R_{PA3}$) is greater than or equal to the total number of moles of recurring units ($R^*_{PA3}$) and ($R^{}_{PA3}$) (the number of moles of recurring unit ($R^{}_{PA3}$) being zero in the case of embodiment (i)). In embodiments in which the semi-aromatic polyamide polymer includes a plurality of recurring units, the total molar concentration of the recurring units are according to the ranges given above with respect to recurring unit ($R_{PA3}$).

Of course, the semi-aromatic polyamide polymer can include a plurality of recurring units. In some such embodiments, one or all of the other recurring units is represented by a Formula (3) to (5), such that each recurring unit is distinct from each other recurring unit. In such embodiments, the total concentration of all recurring units represented by a Formula (3) to (5) is within the ranges specified above with respect to the concentration of recurring unit ($R_{PA3}$).

In general, the semi-aromatic polyamide polymer has an inherent viscosity that is suitable for injection molding processes, though semi-aromatic polyamide polymers having a lower inherent viscosity can be used. In some embodiments, the semi-aromatic polyamide polymer has an inherent viscosity from 0.7 dL/g to 1.4 dL/g, as measured according to ASTM D5336.

In some embodiments, the concentration of the semi-aromatic polyamide polymer in the polyamide polymer blend is at least 5 wt. %. Additionally or alternatively, in some embodiments, the concentration of the semi-aromatic polyamide polymer in the polyamide polymer blend is no more than 50 wt. % or no more than 20 wt. %. In some embodiments, the concentration of the semi-aromatic polyamide polymer in the polyamide polymer blend is from 5 wt. % to 50 wt. % or from 5 wt. % to 20 wt. %.

Reinforcing Fillers

The polyamide polymer blend includes a reinforcing filler. In some embodiments, the reinforcing filler is selected from a fibrous filler and a particulate filler. A fibrous filler refers to a material having length, width and thickness, wherein the average length is significantly larger than both the width and thickness. Generally, such a material has an aspect ratio, defined as the average ratio between the length and the largest of the width and thickness of at least 5.

Preferably, the aspect ratio of the reinforcing fibers is at least 10, more preferably at least 20, still more preferably at least 50.

In some embodiments, the reinforcing filler is selected from a mineral filler; glass fiber; carbon fibers such as notably graphitic carbon fibers (some of them having possibly a graphite content of above 99%), amorphous carbon fibers, pitch-based carbon fibers (some of them having possibly a graphite content of above 99%), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite; silicon carbide fibers; boron fibers, graphene, carbon nanotubes (CNT) and the like. Examples of mineral fillers include, but are not limited to, talc, mica, titanium dioxide, kaolin, calcium carbonate, calcium silicate, and magnesium carbonate.

In some embodiments, reinforcing filler is a glass fiber. Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers. The glass fibers have generally an equivalent diameter of 5 to 20 preferably of 5 to 15 µm and more preferably of 5 to 10 µm. All glass fiber types, such as A, C, D, E, M, S, R, T glass fibers (as described in chapter 5.2.3, pages 43-48 of Additives for Plastics Handbook, 2nd ed, John Murphy), or any mixtures thereof or mixtures thereof may be used.

In some embodiments, the glass fibers are high modulus glass fibers. High modulus glass fibers that have typically an elastic modulus of at least 76, preferably at least 78, more preferably at least 80, and most preferably at least 82 GPa as measured according to ASTM D2343. Examples of high modulus glass fibers include, but are not limited to, S, R, and T glass fibers. A commercially available source of high modulus glass fibers is S-2 Glass® Chopped Strands from AGY.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of SiO2, from 16-28 wt. % of Al2O3 and from 5-14 wt. % of MgO. To the contrary of the regular E-glass fibers widely used in polymer compositions, R, S and T glass fibers comprise less than 10 wt. % of CaO. Excellent results were obtained with E-glass fibers and high modulus glass fibers.

In some embodiments, the fibrous filler, in particular the glass fiber, has a diameter less than 40 µm, less than 30 µm, or less than 10 µm. Additionally or alternatively, in some embodiments, the diameter of the fibrous filler, in particular the glass fiber, is greater than 5 µm or greater than 7 µm. In some embodiments, the fibrous filler, in particular the glass fiber, has a diameter of from 5 µm to 40 µm, from 5 µm to 30 µm, or from 7 µm to 30 µm.

In some embodiments, the fibrous filler, in particular the glass fiber, has a length less than 20 mm, less than 10 mm or less than 5 mm. Additionally or alternatively, in some embodiments, the length of the fibrous filler, in particular the glass fiber, is more than 1 mm or more than 2 mm. In some embodiments, the length of the fibrous filler, in particular the glass fiber, is from 1 mm to 20 mm, from 1 mm to 10 mm, from 1 mm to 5 mm, or from 2 mm to 5 mm.

The concentration of the reinforcing filler in the polyamide polymer blend is at least 30 wt. %, at least 35 wt. %, or at least 40 wt. %. In some embodiments, the concentration of the glass fiber in the polyamide polymer blend is no more than 70 wt. % or no more than 65 wt. %. In some embodiments, the concentration of the glass fiber in the polyamide polymer blend is from 30 wt. % to 70 wt. %, from 35 wt. % to 65 wt. % or from 40 wt. % to 65 wt. %.

Additives and Pigments

The polyamide polymer blend can optionally include one or more additives selected from the group consisting of ultraviolet light stabilizers, heat stabilizers, acid scavengers (i.e. zinc oxide, magnesium oxide), antioxidants, pigments, processing aids, lubricants, flame retardants, and/or conductivity additive (i.e. carbon black and carbon nanofibrils). In some embodiments, the polymer composition can include a flame retardant including, but not limited to, halogen and halogen free flame retardants.

When present the total concentration of additives is at least 0.1 wt. % or at least 0.5 wt. %. Additionally or alternatively, in some embodiments, the concentration of the additives is no more than 40 wt. %, no more than no more than 10 wt. %, no more than 5 wt. % or no more than 1 wt. %. In some embodiments, the concentration of the additives is from 0.1 wt. % to 25 wt. % or from 0.5 wt. % to 10 wt. %.

In some embodiments in which the polyamide polymer blends includes a pigment, the concentration of the pigment is at least 1 wt. %, at least 2 wt. % or at least 3 wt %. Additionally or alternatively, the concentration of the pigment is no more than 35 wt. %, no more than 20 wt. %, no more than 10 wt. %, or no more than 8 wt. %. In some embodiments, the concentration of the pigment is from 0.1 wt. % to 35 wt. %, from 1 wt. % to 20 wt. %, from 2 wt. % to 10 wt. %, or from 3 wt. % to 8 wt. %. In some embodiments, the pigment is a white pigment selected from the group containing titanium dioxide, barium sulfate, zinc sulfide and mixtures thereof. Preferably, the white pigment is titanium dioxide or zinc sulfide.

Methods of Making the Polyamide Polymer Blend

The polyamide polymer blend can be made by methods well known to the person of skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the part material, the components of the polymer composition (e.g. the semi-crystalline aliphatic polyamide polymer, the amorphous semi-aromatic polyamide polymer, the glass fibers, and optional additives) are fed to the melt-mixing apparatus and melt-mixed in that apparatus. The components can be fed simultaneously as a powder mixture or granule mixture, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Articles

The polyamide polymer blend can be incorporated into an article. The polyamide polymer blend can be well suited for the manufacture of articles useful in a wide variety of applications. In particular, in light of the surprisingly improved mechanical performance of the blends, they can be desirably incorporated into mobile electronic device components.

In some embodiments, the polyamide polymer blend can be desirably incorporated into a mobile electronic device component. The term "mobile electronic device" is intended to denote an electronic device that is designed to be conveniently transported and used in various locations. Representative examples of mobile electronic devices include, but are not limited to, mobile phones, personal digital assistants, laptop computers, tablet computers, radios, cameras and camera accessories, watches, calculators, music players, global positioning system receivers, portable game consoles, flash memory storage devices (e.g. USB flash drive and solid state flash drive) and the like. Preferred mobile electronic devices are laptop computers and mobile phones.

Notably, mobile electronic device components, like many other articles, generally require small structural parts. In some embodiments, the mobile electronic device component has a flat portion having a thickness of no more than 2.0 mm or less, no more than 1.6 mm or less, no more than 1.2 mm or no more than 0.8 mm. Due at least in part to the significantly improved mechanical performance, the polyamide polymer compositions described herein are especially desirable in mobile electronic device component application settings.

A mobile electronic device component includes at least one part of the mobile electronic device. A mobile electronic device component includes, but is not limited to, a fitting part, a snap fit part (e.g. a snap fit connector), a mutually moveable part, a functional element, an operating element, a tracking element, an adjustment element, a carrier element, a frame element, a film (e.g. a speaker film), a switch, a connector, a cable, a housing, and any other structural part other than housings as used in a mobile electronic devices, such as, for example, speaker parts.

In one embodiment, the mobile electronic device component is a mobile electronic device housing. A "mobile electronic device housing" refers to one or more of the back cover, front cover, antenna housing, frame and/or backbone of a mobile electronic device. The housing may be a single article or comprise two or more components. "Backbone" refers to a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens or antennas.

In some embodiments, in which the mobile electronic device housing includes the back cover, front cover, antenna housing, or frame, the housing is exposed to and comes into contact the environment external to the mobile electronic device. In some such embodiments, the housing is further designed to come into contact with human body parts during human interaction with the mobile electronic devices. For example, in embodiments in which the mobile electronic device component includes a frame, back cover or front cover of a mobile phone, human hands come into contact with the frame while a person is holding the phone, for example, when providing alphanumeric input into the mobile phone via a keyboard (on-screen keyboard or a keyboard with physical button). In such embodiments, one hand is generally in contact with the frame while providing input. As another example, when talking on the mobile phone, the frame, as noted above, of the mobile phone comes into contact with the hand holding the phone as well as with the face of the person speaking into the phone during a phone conversation. In some embodiments, the mobile electronic device comment is a housing selected from the group consisting of a mobile phone housing, a laptop computer housing and a tablet computer housing. Preferably, the mobile electronic device component is selected from a mobile phone housing and a laptop computer housing.

The mobile electronic device component, as well as other shaped articles, can be formed by methods well known in the art including, but not limited to, injection molding, roto-molding and blow-molding.

EXAMPLES

The following examples demonstrated the mechanical performance of the polyamide polymer blends described herein.

To demonstrate mechanical performance, 8 samples were formed. Each sample consisted of MXD6 (semi-aromatic polyamide polymer) and either a sulfonated polyamide polymer ("sPA") or a non-sulfonated polyamide polymer ("PA"). The MXD6 was commercially obtained from Solvay Specialty Polymers USA, L.L.C. and the sPA and PA were both was synthesized as described in the '222 patent (e.g. Example 6 and Comparative Example 1, both in the '222 patent, for sPA and PA, respectively), the "EXPERIMENTAL SECTION" incorporated herein by reference. MXD6 corresponded to a semi-aromatic polyamide polymer having recurring unit ($R_{P43}$) represented by Formula (5), with $n_5$ equal to 6 and $R^{11}$ and $R^{12}$, at each location, and $R^{13}$ to $R^{15}$ all selected as H. The sPA corresponded to a sulfonated polyamide polymer having (i) recurring unit ($R_{P41}$) represented by Formula (1), with $n_1$ and $n_2$ equal to 6 and 4, respectively, and with $R^1$ to $R^4$, at each location, selected as hydrogen; and (ii) recurring unit ($R_{P42}$) represented by Formula (2a), with $n_3$ equal to 6, $R^5$ and $R^6$, at each location, and $R^7$ to $R^9$ all selected as hydrogen, and M equal to Na ("sPA-Na") or Li ("sPA-Li"). The mole ratio of recurring unit ($R_{P41}$) to recurring unit ($R_{P42}$) was either 95:5 or 93:7. The PA corresponded to a polyamide having substantially all recurring units according to formula (1), with $n_1$ and $n_2$ equal to 6 and 4, respectively, and with $R^1$ to $R^4$, at each location, selected as hydrogen. In all samples, the weight ratio of the PA to the MXD6 was 4:1 and the weight ratio of the sPA to MXD6 was also 4:1, in the corresponding samples. Table 1 displays the sample parameters for each of the samples.

Further to the polyamide polymers, each sample further included less than 1 wt. % of an additive package (including stabilizers and a lubricant) and either 50 wt. % of high modulus glass fibers (circular cross section) commercially obtained from AGY (S-2 553 5/32 SG37) or 50 wt. % of E-glass fibers (non-circular cross section) commercially obtained from Nitto Boseki Co. Ltd. (CSG3PA-820). Some samples further included 5 wt. % of zinc sulfide as a white pigment, commercially obtained from Sachtleben Chemie GmbH (Sachtolith HD-S).

To form the samples, the above components were melt blended, extruded, cooled, and then cut in a pelletizer to form pellets which were then injection molded into standard test specimens for the corresponding mechanical testing, as described above. The sample parameters for each sample are displayed in Table 1, where "E" denotes an example and "CE" denotes a counter-example.

TABLE 1

| Sample | CE1 | E1 | CE2 | E2 | CE3 | E3 | E4 | E5 |
|---|---|---|---|---|---|---|---|---|
| PA [wt. %] | 39.6 | | 35.6 | | 35.6 | | | |
| sPA-Na (95:5) [wt. %] | | 39.6 | | 35.6 | | 35.6 | | |
| sPA-Li (95:5) [wt. %] | | | | | | | 35.6 | |
| sPA-Li (93:7) [wt. %] | | | | | | | | 35.6 |
| MXD6 [wt. %] | 9.9 | 9.9 | 8.9 | 8.9 | 8.9 | 8.9 | 8.9 | 8.9 |
| E-Glass [wt. %] | 50 | 50 | 50 | 50 | 50 | | | |
| High Modulus Glass [wt. %] | | | | | | 50 | 50 | 50 |
| ZnS [wt. %] | | | 5 | 5 | 5 | 5 | 5 | 5 |
| Additive Package [wt. %] | 0.5 | 0.5 | 0.5 | 0.5 | 0.5 | 0.5 | 0.5 | 0.5 |

To demonstrate the mechanical performance of the samples, tensile properties, flexural properties and impact properties were tested. Tensile modulus, strength and elongation were tested according to ISO 527-2 at room temperature (25° C.). Flexural modulus, strength and elongation were tested according to ISO 178 at room temperature. Notched and un-notched Izod impact were tested according to ISO 180 at room temperature. Table 2 demonstrates the mechanical performance of each of the samples.

TABLE 2

| Sample | | CE1 | E1 | CE2 | E2 | CE3 | E3 | E4 | E5 |
|---|---|---|---|---|---|---|---|---|---|
| Tensile Properties | Modulus (GPa) | 17.1 | 17.9 | 18.2 | 19.1 | 20.8 | 21.5 | 20.5 | 20.9 |
| | Strength (MPa) | 256 | 279 | 254 | 277 | 280 | 310 | 289 | 305 |
| | Elongation (%) | 2.5 | 2.4 | 2.4 | 2.3 | 2.8 | 2.7 | 2.8 | 2.8 |
| Flexural Properties | Modulus (GPa) | 15.9 | 16.5 | 16.9 | 17.7 | 19.8 | 20.1 | 19.6 | 19.9 |
| | Strength (MPa) | 377 | 400 | 374 | 391 | 430 | 467 | 445 | 469 |
| | Elongation (%) | 2.84 | 2.77 | 2.63 | 2.54 | 2.94 | 2.85 | 2.9 | 2.92 |
| Impact Properties | Notched (kJ/m$^2$) | 15.8 | 18.8 | 16.1 | 17.4 | 17 | 18 | 21 | 29 |
| | Un-Notched (kJ/m$^2$) | 76 | 77 | 77 | 75 | 90 | 105 | 97 | 105 |

Referring to Table 2, the samples including the sulfonated polyamide copolymer had increased mechanical performance, relative to corresponding samples prepared with without the sulfonated polyamide copolymer. For example, sample E1 had increased tensile modulus and strength; flexural modulus and strength, and notched impact, relative to sample CE1. Similar results were obtained for sample E2, relative to sample CE2, and for sample E3 and E5, relative to sample CE3. Additionally, comparison of sample E4 with sample CE3 demonstrated similar results, except for the tensile and flexural moduli, which were similar for both samples.

Furthermore, as shown in Table 2, samples including a sulfonated polyamide copolymer with a sodium counter-ion (M=Na in Formula (2)) surprisingly had increased tensile and flexural modulus and strength, relative to corresponding samples including sulfonated polyamide copolymers with a lithium counter-ion (M=Li in Formula (2)). For example, for both tensile and flexural properties, sample E4 (M=Li) had a reduced modulus relative to sample CE3 and E3 (M=Na in Formula (2)), while sample E3 had an increased modulus and strength relative to samples CE3 and E4. Additionally, sample E3 had increased un-notched impact performance relative to samples E4 and CE3.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A polyamide polymer blend comprising:

from 5 wt. % to 65 wt. % of a sulfonated polyamide polymer;

from 5 wt. % to 50 wt. % of a semi-aromatic polyamide polymer; and from 20 wt. % to 70 wt. % of a reinforcing filler;

wherein
the sulfonated polyamide polymer comprises recurring units ($R_{PA1}$) and ($R_{PA2}$), wherein said recurring unit ($R_{PA1}$) is represented by the following formula:

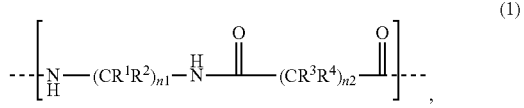
(1)

and
said recurring unit ($R_{PA2}$) is represented by a formula selected from the following group of formulae:

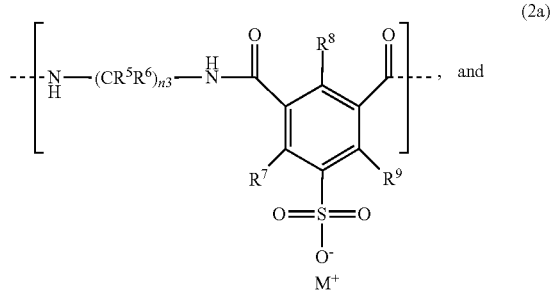
(2a)

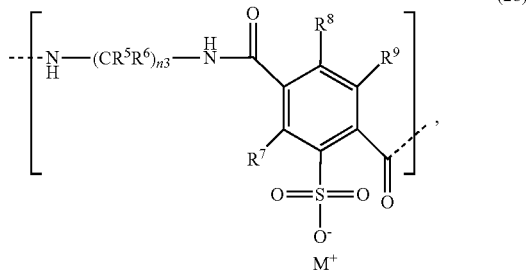
(2b)

wherein
$R^1$ to $R^6$, at each location, and $R^7$ to $R^9$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
M is either H, Li, Na or K;
$n_1$ and $n_3$ are independently selected integers from 4 to 12; and
$n_2$ is an integer from 4 to 12, preferably from 5 to 12; and
the semi-aromatic polyamide polymer comprises a recurring unit ($R_{PA3}$) that is represented by a formula selected from the following group of formulae:

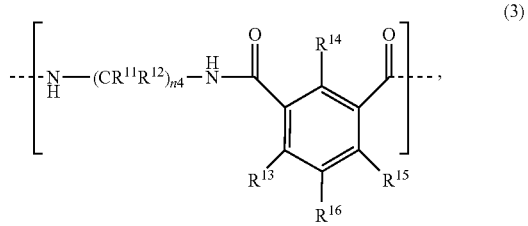
(3)

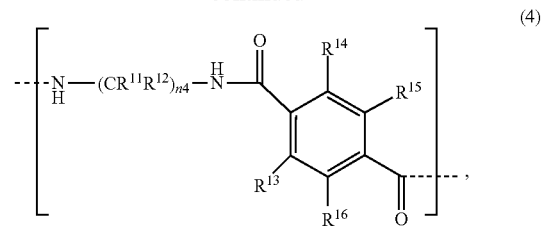
(4)

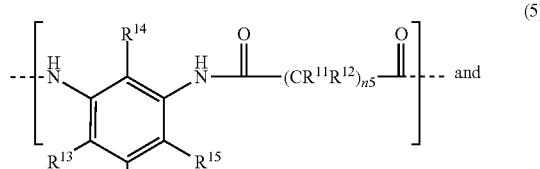
(5)

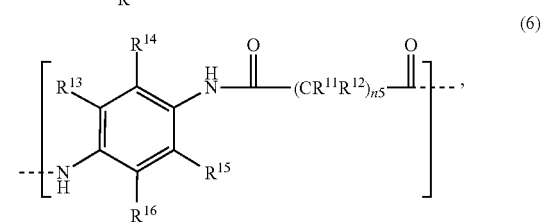
(6)

wherein
$R^{11}$ and $R^{12}$, at each location, and $R^{13}$ to $R^{16}$ are independently selected from the group consisting of a hydrogen, a halogen, an alkyl, an alkenyl, an alkynyl, an aryl, an ether, a thioether, a carboxylic acid, an ester, an amide, an imide, an alkali or alkaline earth metal phosphonate, an alkyl phosphonate, an amine, and a quaternary ammonium;
$n_4$ is an integer from 4 to 12; and
$n_5$ is an integer from 4 to 12.

2. The polyamide polymer blend of claim 1, wherein M is Na.

3. The polyamide polymer blend of claim 1, wherein $n_1$, $n_3$, and $n_4$ are all the same; or $n_2$ and $n_5$ are the same; or both.

4. The polyamide polymer blend of claim 1, wherein $R^1$ to $R^6$, at each location, and wherein $R^7$ to $R^9$ are all hydrogen.

5. The polyamide polymer blend of claim 1, wherein either recurring unit ($R_{PA2}$) is represented by Formula (2a), recurring unit ($R_{PA3}$) is represented by Formula (3), or both.

6. The polyamide polymer blend of claim 1, wherein $R^{11}$ and $R^{12}$, at each location, and $R^{13}$ to $R^{16}$ are all hydrogen.

7. The polyamide polymer blend of claim 1, wherein the reinforcing filler comprises a glass fiber.

8. The polyamide polymer blend of claim 7, wherein the glass fiber comprises a non-circular cross section.

9. The polyamide polymer blend of claim 7, wherein the glass fiber comprises a high modulus glass fiber having an elastic modulus of at least 76 GPa, as measured according to ASTM D2343.

10. The polyamide polymer blend of claim 1, wherein the polyamide polymer blend has a tensile modulus from 10 GPa to 35 GPa, as measured according to ISO 527-2 at room temperature (25° C.).

11. The polyamide polymer blend of claim 1, wherein the polyamide polymer blend has a tensile strength of from 200 MPa to 500 MPa, as measured according to ISO 527-2 at room temperature.

12. The polyamide polymer blend of claim 1, wherein the polyamide polymer blend has a flexural modulus of from 10 GPa to 35 GPa, as measured according to ISO 178 at room temperature.

13. The polyamide polymer blend of claim 1, wherein the polyamide polymer blend has a flexural strength of from 250 MPa to 700 MPa, as measured according to ISO 178 at room temperature.

14. An article comprising a flat portion having a thickness of no more than 2.0 mm, wherein the portion comprises the polyamide polymer blend of claim 1.

15. The article of claim 14, wherein the article is mobile electronic device component selected from the group consisting of a mobile phone, a personal digital assistant, a laptop computer, a tablet computer, a radio, a camera, a camera accessory, a watch, a calculator, a music player, a global positioning system receiver, a portable game console, and a flash memory storage device.

16. The polyamide polymer blend of claim 1, wherein $n_1$, $n_3$ and $n_4$ are 6; or $n_2$ and $n_5$ are 4; or both.

* * * * *